2,333,789

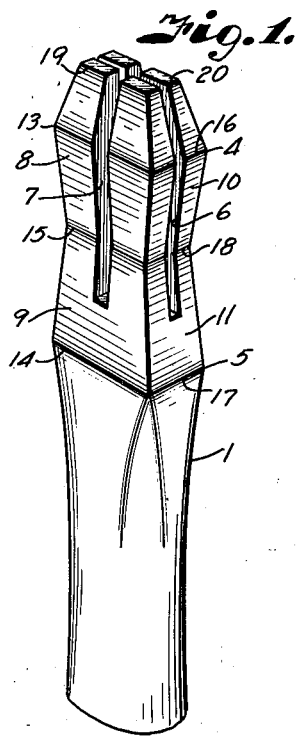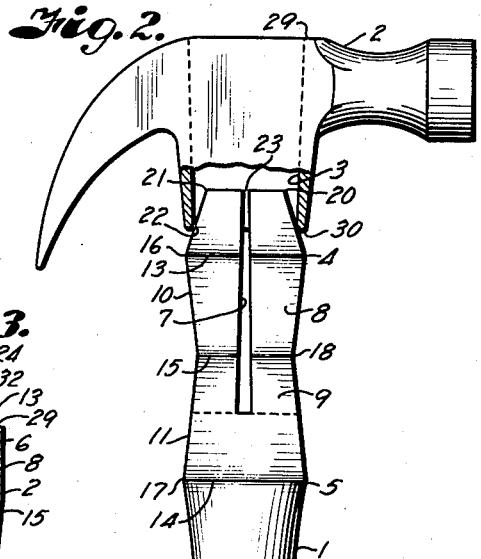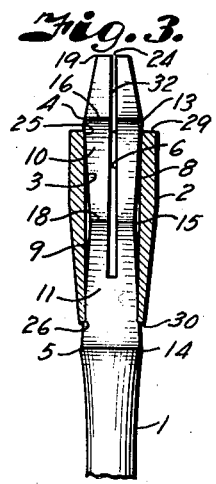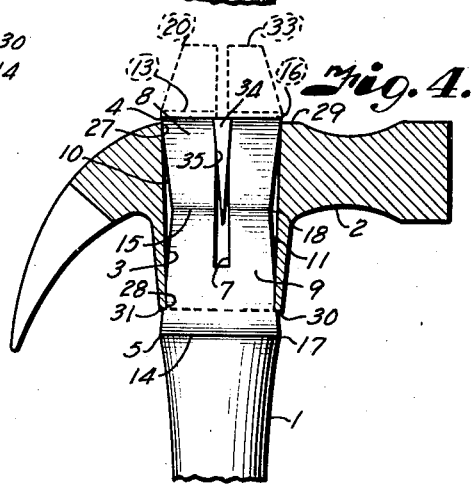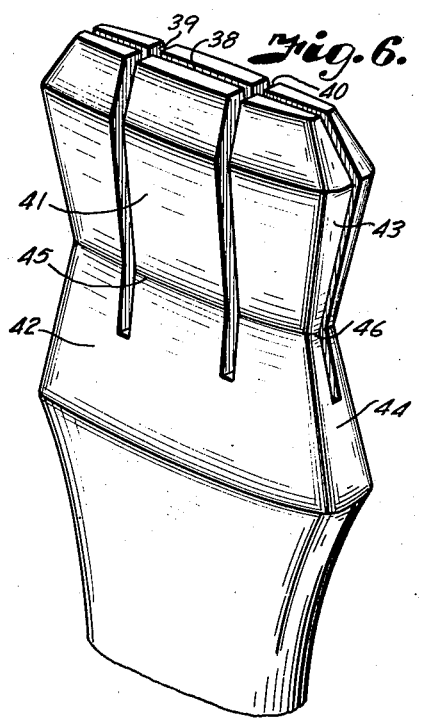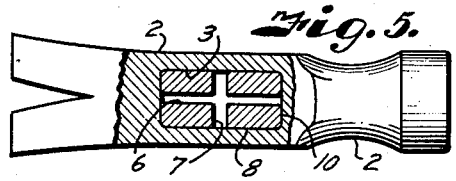
INVENTOR
Edwin R. T. Howard
BY
ATTORNEY Patented Nov. 9, 1943

UNITED STATES PATENT OFFICE 2,333,789

TOOL HANDLE

Edwin R. T. Howard, Houston, Tex.

Application July 3, 1942, Serial No. 449,694

3 Claims. (Cl. 306—33)

This invention relates to tool handles and more particularly to the eye portion of tool handles for headed tools, such as hammers, hatchets, axes, picks and the like.

Conventional tool handles are made with the eye portions larger than the opening in the head of the tool in which they are to be inserted, and it is necessary that they be "dressed down" or shaped by hand tools to fit the tool head, this operation requiring considerable time in fitting the handle to the tool head, and sometimes resulting in the handle being placed in the tool head in improper relation thereto.

The principal object of the present invention, therefore, is to provide a tool handle which may be quickly and easily placed in a tool head without the necessity of dressing or shaping the eye portion to the tool head.

Other objects of the invention are to provide a tool handle to fit tools of wedge-head or slip-head type; to provide a tool handle to fit tool heads of varying sizes and dimensions; to provide a tool handle having better alignment with the tool head after it is inserted therein due to mechanical instead of hand shaping of the eye portion of the handle; to provide for more easily wedging the tool handle in a tool head; to provide for more firmly securing a tool handle to a tool head; to provide a better fit for the handle and tool head; and to provide plane surfaces for the handle inclining toward the central axis of the eye portion of the handle.

In accomplishing these and other objects of the present invention I have provided improved details of structure, the preferred forms of which are illustrated in the accompanying drawing, wherein:

Fig. 1 is a fragmentary perspective view of a tool handle embodying the features of the present invention.

Fig. 2 is a side elevational view of the eye portion of a tool handle of wedge-on type showing a hammer head being applied thereto, portions of the hammer head being broken away to better illustrate the structure.

Fig. 3 is a vertical transverse sectional view through a hammer head applied to the eye portion of a tool handle.

Fig. 4 is a side elevational view of the eye portion of a tool handle showing the assembly of the tool head completed, the portion of the handle removed after insertion being shown in dotted lines.

Fig. 5 is an end view showing a portion of the hammer head and handle in section to better illustrate the construction thereof.

Fig. 6 is a perspective view of a modified form of the handle particularly adapted for larger tools.

Referring more in detail to the drawing:

1 designates a handle, preferably made of wood, adapted for use in a tool head 2, having an opening 3 of substantially rectangular shape, Fig. 2. The handle is provided with an eye portion, 4, 5 at one end thereof, having a longitudinal slot 6 extending substantially the entire length of the eye portion, and a slot 7 arranged transversely of the longitudinal slot extending substantially the same distance relative to the length of the eye portion as the longitudinal slot 6.

The eye portion of the tool handle is larger than the opening of a tool head in which it is intended to be used, and is provided with plane surfaces 8, 9 on opposite sides of the eye portion, and plane surfaces 10, 11 on opposite ends thereof. The plane surfaces 8, 9 are inclined slightly inwardly from the apices thereof, as indicated at 13 and 14, to the central axis of the eye portion, as indicated at 15. The plane surfaces 10 and 11 are also inclined inwardly from apices 16 and 17 to the central axis, as indicated at 18.

The outer end of the eye portion is inclined from the apices 13 and 16 to the end of the handle, as indicated at 19 and 20; thus providing a smaller tapered surface at the end of the eye portion of the handle for easy insertion in the tool head, as indicated at 21, Fig. 2.

In assembling a handle of my improved construction in a hammer head, as illustrated in Fig. 2, the tapered point of the handle is inserted in the eye 3 of the hammer head 2 so that the sides and edges of the handle contact the interior walls of the eye 3, as shown at 22. The head of the tool is ordinarily forced on the eye portion of the handle by striking the outer end of the handle (not shown), against a hard surface, as is well known. When pressure is applied to the handle and the handle is forced into the eye tool, the eye portion 4, 5 contracts and the longitudinal and transverse slots 6 and 7 are narrowed, particularly at the outer end thereof, as indicated at 23, Fig. 2, and 24, Fig. 3. As the handle is forced through the eye of the tool head, the slots may be entirely closed at the outer end of the eye portion, and partially closed at the base of the eye portion, until the handle passes through the tool eye and reaches the position shown in Figs. 3 and 4.

More particularly, the handle is forced through the tool eye until the eye passes over the apices 13 and 16 of the eye portion of the handle and the plane surfaces 8, 9, 10 and 11 on opposite sides and edges of the eye portion come to rest against the interior walls of the eye of the tool head, as indicated at 25, 26, Fig. 3, and 27, 28, Fig. 4, in such a manner that the apices 13 and 16 of the plane surfaces 9 and 10 are adjacent with the outer face 29, Fig. 4, of the tool head, and the inner end 30 of the tool eye is forced tightly against plane surfaces adjacent the apices 14 and 17 to form a shoulder 31, as illustrated in Fig. 4.

After the eye portion 4, 5 passes through the tool head, the eye portion expands to tightly engage the walls of the tool eye and the longitudinal and transverse slots open as shown at 32, Fig. 3.

The tapered end 33 extending beyond the face 29 of the tool head may then be cut off, by sawing or otherwise, so that the handle is flush with the face of the head as shown by dotted lines, Fig. 4.

Wedges 34, Fig. 4 are then driven into the longitudinal and transverse slots 6 and 7 to further expand the eye portion 4, 5, as indicated at 35, Fig. 4, and 36, Fig. 5, so that the eye of the tool head is substantially filled by the handle and the handle is firmly held in the tool head.

The modified form of handle illustrated in Fig. 6 is intended for use on tools having eyes of larger dimension than the conventional claw hammer above described, such as picks, double-bitted axes, or the like. Such a handle is provided with a longitudinal slot 38 in the eye portion thereof, and a plurality of transverse slots 39, 40. This form of structure also has surfaces 41, 42 on the sides and 43, 44 on the end edges of the eye portion inclining inwardly toward the central axes 45, 46 thereof, as with the form illustrated in Fig. 1.

In assembling this form of handle the operation is substantially the same as that described for the form of invention shown in Fig. 1. The greater number of slots allows greater contraction and expansion of the eye portion which provides easier insertion in a tool head having eyes of relatively large dimensions.

It is well known that the eye portion of tool heads vary in dimension considerably. With my invention, should the tool head 2 have an eye of normal shape and dimension the wall 30 of the head will come to rest at a point substantially mid-way between the apex 14 of the plane surface 9 and the central axis 15 of the eye portion of the tool handle. If the tool eye is smaller the wall of the head will come to rest at a point nearer the central axis 15. If the tool eye is larger the wall of the head will come to rest at a point nearer the apex 14 of the plane surface 9.

It will thus be seen that with my improved structure, I have provided a tool handle having an eye portion which may assume smaller dimensions when forced into a tool head and which expands to nearly its normal dimensions after passing through the eye of the tool head, according to the size of such head. The expansion of the eye portion of the tool handle after its insertion in the tool head causes the outer surfaces thereof to contact the inner walls of the tool eye, and the enlarged apices 13 and 16 of the plane surfaces 8 and 10 press firmly against the inner wall of the outside face of the tool head, thus tending to prevent the head from slipping off the handle. When wedges are driven into place, this further tends to press the outer inclined plane surfaces against the inside walls of the tool head. The plane surfaces 9 and 11 inclining inwardly toward the central apex of the eye portion or toward the outer plane surfaces tend to hold the handle in the tool head in fixed position so that the head does not slip in either direction on the handle, as there is an inherent tension in the forces working from the apices of the plane surfaces toward the central axes of the eye portion.

While I have illustrated a handle for use in a tool head having an eye of nearly rectangular and round shapes, it will be apparent that the handle may be made to fit any shape tool eye, such as quadrilateral, oval, triangular and the like, and may be made of any suitable material.

What I claim and desire to secure by Letters Patent is:

1. A tool handle having an eye portion provided with longitudinal and transverse slots and having surfaces converging from the ends of the eye portion toward the center to form a reduced section at the center of said eye portion, the ends of the eye portion being of larger cross section than the central body of said eye portion, whereby the ends of said eye portion are adapted to engage the outer and inner edges of the eye of a tool head when the handle is inserted in said head.

2. In combination with a tool head having an eye, an elongated handle having a slotted eye portion at one end thereof adapted to be inserted in the eye of said tool head, said eye portion being of longer length than the eye of the tool head, the ends of the eye portion being of larger cross section than the eye in the tool head, the sides of said eye portion of the handle forming faces converging from the ends of the eye portion and meeting in a plane perpendicular to the longitudinal central axis of the handle and substantially midway between the ends of said eye portion, thereby forming a reduced portion at the center of the eye portion of the handle whereby the ends of the eye in the tool head are engaged by the sides of the eye portion of the handle at points spaced from the plane midway of the eye portion and intermediate the ends of said eye portion.

3. In combination with a tool head having an eye, an elongated handle having an eye portion at one end thereof adapted to be inserted in the eye of said tool head, said eye portion being of longer length than the eye of the tool head and having longitudinal and transverse slots, the ends of the eye portion being of larger cross section than the eye in the tool head, the sides of said eye portion of the handle forming faces converging from the ends of the eye portion and meeting in a plane perpendicular to the longitudinal central axis of the handle and substantially midway between the ends of said eye portion, thereby forming a reduced portion at the center of the eye portion of the handle whereby the ends of the eye in the tool head are engaged by the sides of the eye portion of the handle at points spaced from the plane midway of the eye portion and intermediate the ends of said eye portion, the end of the handle extending through the eye in the tool head being tapered outwardly to facilitate insertion of the handle in said head.

EDWIN R. T. HOWARD.